United States Patent [19]
Honda

[11] Patent Number: 5,050,152
[45] Date of Patent: Sep. 17, 1991

[54] OPTICAL PICKUP DEVICE COMPENSATING FOR CARRIAGE/GUIDE PLAY OR WOBBLE

[75] Inventor: Syuichi Honda, Yokohama, Japan
[73] Assignee: Ricoh Company, Ltd., Tokyo, Japan
[21] Appl. No.: 377,718
[22] Filed: Jul. 10, 1989
[30] Foreign Application Priority Data
  Jul. 13, 1988 [JP] Japan .................................. 63-175460
[51] Int. Cl.$^5$ .............................................. G11B 7/00
[52] U.S. Cl. ................................................ 369/44.32
[58] Field of Search .................. 369/44.14, 44.32, 112; 358/342

[56] References Cited
U.S. PATENT DOCUMENTS
  4,688,201 8/1987 Towner et al. .................. 369/112 X
  4,822,139 4/1989 Yoshizumi ........................ 369/44.16

Primary Examiner—Robert L. Richardson
Attorney, Agent, or Firm—Cooper & Dunham

[57] ABSTRACT

An optical pickup device for an optical disk having a recording surface comprises a stationary optical system having an incident optical axis, which is parallel to a radial direction of the optical disk. The stationary optical system is adapted to transmit a light beam emitted from a light source along the incident optical axis. A carriage is provided for linear movement in a seeking direction along the incident optical axis of the stationary optical system. A deflecting member is secured to the carriage and has a deflecting face for receiving the light beam transmitted from the stationary optical system along the incident optical axis and for deflecting the same toward the recording surface of the optical disk. An objective lens for converging the light beam deflected by the deflecting member on the recording surface of the optical disk and for leading a light beam reflected by the recording surface of the optical disk toward the deflecting member, is supported on the carriage and disposed between the deflection member and the optical disk. The distance between the deflection point of the deflection prism and the center of the objective lens is approximately twice the focal length of the objective lens.

7 Claims, 3 Drawing Sheets

OPTICAL PICKUP DEVICE COMPENSATING FOR CARRIAGE/GUIDE PLAY OR WOBBLE

BACKGROUND OF THE INVENTION

The present invention relates generally to an optical pickup device. More particularly, the invention relates to an optical pickup device for performing recording and/or reproduction of information to an optical disk such as, for example, a magneto-optical disk, a phase-changeable optical disk or the like.

Generally, an optical recording/reproducing apparatus having an optical pickup device for an optical disk as a recording medium has an advantage in that an extremely large amount of information can be stored in the optical disk with a high-speed access in comparison to a magnetic recording/reproducing apparatus using magnetic tapes or magnetic disks as a recording medium.

In conventional optical pickup devices used in the above-mentioned optical recording/reproducing apparatus, generally, a light beam emitted from a light source is converted to a parallel light beam and then converged to a recording surface of an optical disk through various optical elements. A light beam reflected by the recording surface of the optical disk is then received by light detecting elements such as photodiodes and converted thereby to an electric signal from which information data can be read. Further, based on the detection of the light beam reflected from the recording surface of the optical disk, servo controls for focusing and tracking of the light beam with respect to the optical disk are performed.

Recently, even in such optical pickup devices, it has been desirable to speed up the accessing operation. In view of this requirement, there has been developed an optical pickup device of a separation type in which an optical system is separated into a stationary optical system and a movable optical system. The stationary optical system is adapted to transmit a light beam emitted from a light source along an incident optical axis thereof which is parallel to a radial direction of the optical disk.

The movable optical system of the conventional optical pickup device comprises a carriage which is movably guided with a guide rail for linear movement in a seeking direction along the incident optical axis of the stationary optical system. The carriage is provided with a deflecting member which has a deflecting face for receiving the light beam transmitted from the stationary optical system along the incident optical axis and for deflecting the same toward the recording surface of the optical disk. The carriage is also provided with an objective lens for converging the light beam deflected by the deflecting member on the recording surface of the optical disk and for leading a light beam reflected by the recording surface of the optical disk toward the deflecting member.

Further, the stationary optical system is provided with a focusing detector and a tracking detector. The light beam reflected by the recording surface of the optical disk is divided into two beam branches after being deflected by the deflecting member so that the beam branches are led to the focusing detector and the tracking detector, respectively.

This construction of the separation-type optical pickup device makes it possible to decrease the number of optical elements to be mounted on the carriage and thereby to reduce the weight and size of the movable optical system.

In the separation-type optical pickup device, however, it is difficult to assemble the carriage with the guide rail with no play therebetween, given the realities of manufacturing tolerances. In this situation, when the carriage is moved in the seeking direction, the play between the carriage and the guide rail causes the carriage to be inclined about an axis which is parallel to the recording surface of the optical disk and perpendicular to the seeking direction. As the carriage is inclined, the deflecting member and the objective lens are also angularly displaced. Accordingly, the inclination of the carriage causes the movable optical system to generate an undesirable offset of the light beam reflected from the optical disk with respect to the incident optical axis of the stationary optical system. Generally, the detection of the tracking condition has to be effected with a tolerance of about 0.03 μm, while the detection of the focusing condition has to be effected with a tolerance of about 0.3 μm.

Accordingly, an occurrence of offset of the reflected light beam with respect to the incident optical axis can greatly influence the detection of tracking condition of the optical pickup device.

SUMMARY OF THE INVENTION

Therefore, it is an object of the present invention to provide an optical pickup device of a separation type which makes it possible to carry out the detection of tracking condition of the optical pickup device with high accuracy, even if a carriage for supporting a deflection member and an objective lens is inclined due to production errors thereof.

Further object of the present invention is to provide an optical pickup device for an optical disk, which makes it possible to minimize the offset of a light beam reflected from the optical disk, with respect to an incident optical axis for an incident light beam, when a carriage for supporting a deflection member and an objective lens is inclined due to production errors thereof.

The above-mentioned objects of the present invention can be achieved by an optical pickup device for an optical disk having a recording surface, comprising: a light source for emitting a light beam; a stationary optical system having an incident optical axis, which is parallel to a radial direction of the optical disk, and adapted to transmit the light beam emitted from the light source along the incident optical axis; a carriage which is movable along the incident optical axis of the stationary optical system; a deflecting member secured to the carriage and having a deflecting face for receiving the light beam transmitted from the stationary optical system along the incident optical axis and for deflecting the same toward the recording surface of the optical disk; and an objective lens for converging the light beam deflected by the deflecting member on the recording surface of the optical disk and for leading a light beam reflected by the recording surface of the optical disk toward the deflecting member, the objective lens being supported on the carriage and disposed between the deflection member and the optical disk, the distance between the intersection of the incident optical axis with the deflection face of the deflection member and the center of the objective lens being approximately twice the focal length of the objective lens.

In the above-mentioned construction of the optical pickup device, since the distance between the intersection of the incident optical axis with the deflection face of the deflection member and the center of the objective lens being approximately twice the focal length of the objective lens, it is possible to minimize the offset of a light beam reflected from the optical disk, with respect to the incident optical axis for an incident light beam, when the carriage is inclined due to production errors thereof.

Therefore, it is possible, according to the present invention, to carry out the detection of tracking condition of the optical pickup device with high accuracy, even if the carriage is inclined due to production errors thereof.

Further objects, features and advantages of the present invention will become apparent from the following description of the preferred embodiments of the present invention as illustrated in the accompanying drawings.

DESCRIPTION OF THE PREFERRED EMBODIMENTS

Figure 1:
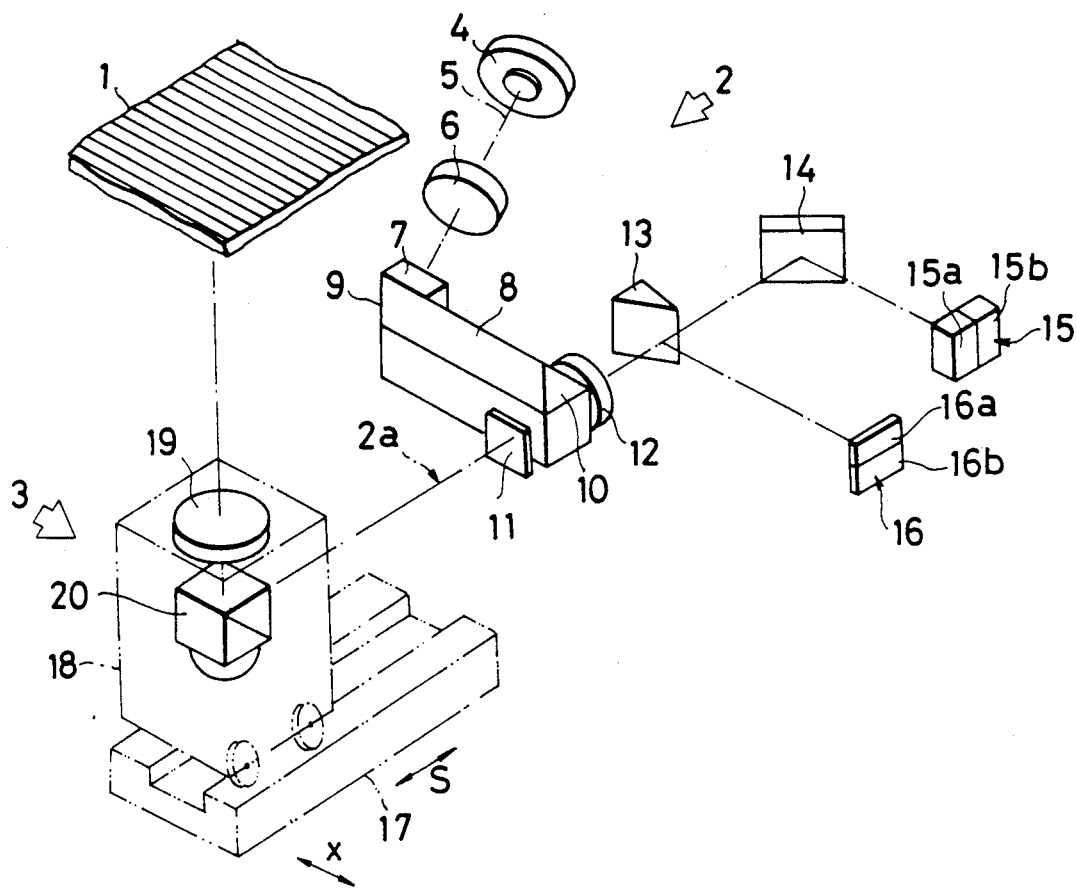
FIG. 1 is a perspective view of the optical pickup device according to the present invention.

FIG. 1 shows an arrangement of the whole of the optical pickup device according to the present invention.

In FIG. 1, an optical disk is fragmentarily illustrated and designated by reference numeral 1, and the optical pickup device comprises stationary and movable optical systems which are generally designated by reference numerals 2 and 3, respectively.

First, explanation will be made as to the construction of the stationary optical system 2.

Referring to FIG. 1, a semiconductor laser 4 as a light source is provided for emitting a laser beam 5 as a light beam along an optical axis thereof. A coupling lens 6 such as a collimating lens is disposed on the optical axis of the semiconductor laser 4. Also a shaping prism 7 for shaping the laser beam 5 transmitted through the coupling lens 4 is disposed on the optical axis of the semiconductor laser 4.

Designated by reference numeral 8 is a roof prism (Dach Prism) 8. The roof prism 8 is formed at one end thereof with a reflex portion 9 for reflecting the laser beam 5, which has been transmitted through the shaping prism 7, at right angles toward the other end of the roof prism 8 opposite to the one end thereof.

Provided integrally with the roof prism 8 at the other end thereof is a beam splitter 10 for reflecting the laser beam 5, which has been reflected from the reflex portion 9, at right angles toward the movable optical system 3 along a predetermined incident optical axis 2a which is parallel to the radial direction of the optical disk 1. The beam splitter 10 also serves to pass therethrough a laser beam transmitted from the movable optical system 3.

A quarter-wave (¼ wavelength) plate 11 is disposed near the one side of the beam splitter 10 on an optical path between the beam splitter 10 and the movable optical system 3. A converging lens 12 is disposed near the other side of the beam splitter 10 on an optical path of the laser beam transmitted through the beam splitter 10 from the movable optical system 3.

Also disposed on the optical path of the laser beam transmitted through the beam splitter 10 are a knife-edge prism 13 for cutting off a part of the laser beam converged by the converging lens 12, a mirror 14, and a focusing condition detector 15. The focusing condition detector 15 has a pair of light-receiving elements such as photodiodes 15a and 15b. The part of the laser beam cut off by the knife-edge prism 13 is reflected thereby to a right angle toward a tracking condition detector 16 which has a pair of light-receiving elements such as photodiodes 16a and 16b.

Next, explanation will be made as to the construction of the movable optical system 3.

A stationary guide rail 17 is placed along a seeking direction S which extends in parallel to the radius direction of the optical disk 1. Movably held on the guide rail 17 along the seeking direction S is a carriage 18 which is driven by a moving means such as linear motor (not shown). The carriage 18 is provided with an objective lens 19, which faces the optical disk 1, and a deflecting prism 20 which is disposed under the objective lens 19.

Explanation will now be made as to the operation of the above-described separation-type optical recording-/reproducing apparatus.

In the case, for example, that the optical recording-/reproducing apparatus is in the mode of operation for reproducing information recorded on the recording surface of the optical disk 1, the laser beam 5 emitted from the semiconductor laser 4 passes through the coupling lens 6 and shaping prism 7 and is then reflected by the reflex portion 9 of the roof prism 8. The laser beam reflected by the reflex portion 9 is further reflected by the beam splitter 10 toward the quarter-wave plate 11 along the seeking direction S. The laser beam reflected by the beam splitter 10 passes through the quarter-wave plate 11 and is then reflected upward by the deflecting prism 20 of the movable optical system 3. The reflected laser beam from the deflecting prism 20 is converged by the objective lens 19 and impinges on a target track formed in the recording surface of the optical disk 1, so that the laser beam is reflected back by the target track of the recording surface in accordance with information recorded on the target track.

The reflected beam including the recorded information passes through the objective lens 19 again and is then reflected by the deflecting prism 20 toward the quarter-wave plate 11 along the seeking direction S. The reflected laser beam from the deflecting prism 20 passes through the quarter-wave plate 11 again, and accordingly, the state of polarization of the laser beam is changed so as to be able to pass through the beam splitter 10. The laser beam passed through the beam splitter 10 is then converged by the converging lens 12 toward the knife-edge prism 13 where the converged laser beam is divided into two laser beam branches: a first laser beam branch which is reflected by the knife-edge prism toward the tracking condition detector 16 and a second laser beam branch which goes straight along the seeking direction S toward the mirror 14 across the knife-edge prism 13.

The first laser beam branch reflected by the knife-edge prism 13 is detected by the light receiving elements 16a and 16b of the tracking condition detector 16. The light receiving elements 16a and 16b are each adapted to produce an output signal which corresponds to the amount of light received thereby.

Accordingly, it is possible to detect the tracking condition of the movable optical system 3 with respect to the optical disk 1, on the basis of the light-receiving condition of the light receiving elements 16a and 16b, as described later in detail.

On the other hand, the second laser beam branch reflected by the mirror 14 is detected by the light receiving elements 15a and 15b of the focusing condition detector 15. The light receiving elements 15a and 15b are each adapted to produce an output signals which corresponds to the amount of light received thereby. Accordingly, it is possible to detect the focusing condition of the movable optical system 3 with respect to the optical disk 1, i.e., the distance between the objective lens 19 and the optical disk 1, on the basis of the light-receiving condition of the light receiving elements 16a and 16b, in the following manner.

Figure 2A:
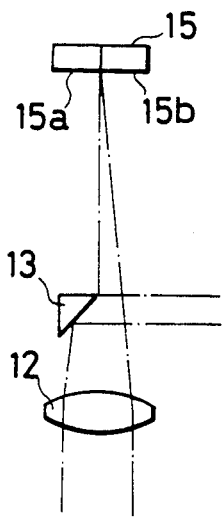
FIGS. 2(a) to 2(c) are views for explaining the operation of the optical pickup device shown in FIG. 1, respectively, for detecting the focusing condition thereof with respect to an optical disk.

Referring to FIG. 2(a), there is shown a light-receiving condition of the light receiving elements 15a and 15b in the case that the distance between the objective lens 19 and the optical disk 1 is proper with respect to the focal length of the objective lens 19. In this case, the second laser beam branch is converged on the boundary between the two light receiving elements 15a and 15b as the center of the focusing condition detector 15. Accordingly, in this case, when the outputs of the light receiving elements 15a and 15b are given as A and B, respectively, the relationship between the two outputs is detected as $A-B=0$.

Figure 2B:
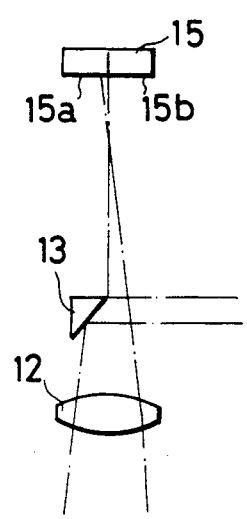

On the other hand, in the case that the distance between the objective lens 19 and the optical disk 1 is greater than the focal length of the objective lens 19, the second laser beam branch of the laser beam is converged just before the focusing condition detector 15, as shown in FIG. 2(b). In this case, since a part of the laser beam on the left side thereof is cut off by the knife-edge prism 13, the amount of the laser beam incident on the light receiving element 15a becomes greater than that of the laser beam incident on the light receiving element 15b. Accordingly, the difference between the outputs of the light receiving elements 15a and 15b is detected as $A-B>0$.

Figure 2C:
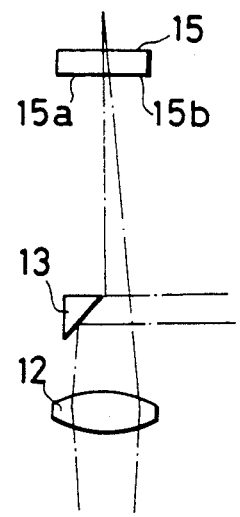

Conversely, when the distance between the objective lens 19 and the optical disk 1 is shorter than the focal length of the objective lens 19, the laser beam is assumed to be converged beyond the focusing condition detector 15, as shown in FIG. 2(c), and thus the amount of the laser beam incident on the light receiving element 15b becomes greater than that of the laser beam incident on the light receiving element 15a. Accordingly, the difference between the outputs of the light receiving elements 15a and 15b is detected as $A-B<0$.

When the difference between the outputs of the light receiving elements 15a and 15b is detected as $A-B>0$ or $A-B<0$, the objective lens 19 is adjusted in position in the vertical direction with respect to the optical disk 1, by means of a focusing control actuator (not shown).

Explanation will now be made as to the detection of the tracking condition of the movable optical system 3 with respect to the optical disk 1.

Figure 3A:
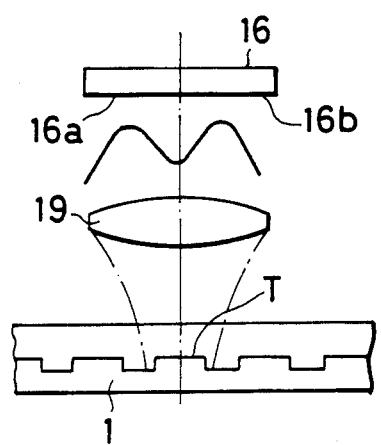
FIGS. 3(a) and 3(b) are views for explaining the operation of the optical pickup device shown in FIG. 1, respectively, for detecting the tracking condition thereof with respect to an optical disk.
Figure 3B:
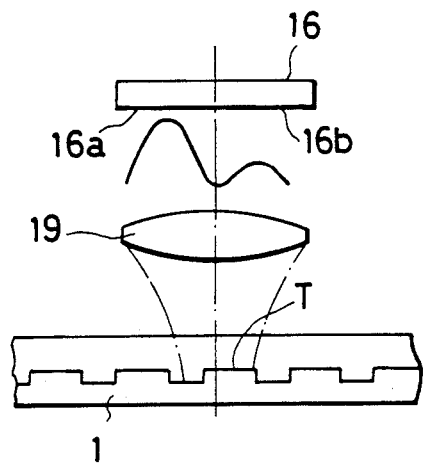

In the case that the optical axis of the objective lens 19 is coincident in position with a target track T to be accessed, the first laser beam reflected by the knife-edge prism 13 is converged on the boundary between the light receiving elements 16a and 16b as the center of the tracking condition detector 16, as shown in FIG. 3(a). In this case, when the outputs of the light receiving elements 16a and 16b are given as C and D, respectively, the difference between the outputs of the light receiving elements 16a and 16b is detected as $C-D=0$.

On the other hand, in the case that, for example, the optical axis of the objective lens 19 is deviated to the right from a target track T to be accessed, the amount of the laser beam incident on the light receiving element 16a becomes greater than that of the laser beam incident on the light receiving element 16b. Accordingly, the difference between the outputs of the light receiving elements 16a and 16b is detected as $C-D>0$.

When the difference between the outputs of the light receiving elements 16a and 16b is detected as $C-D>0$ or $C-D<0$, the objective lens 19 is adjusted in position in the horizontal direction or about a predetermined horizontal axis by means of a tracking actuator (not shown).

Generally, it is difficult to assemble the carriage 18 with the guide rail 17 with no play therebetween, due to an error on production. In this situation, when the carriage 18 is moved in the seeking direction S, play between the carriage and the guide rail 17 can cause the carriage 18 to be inclined about an axis X which is parallel to the recording surface of the optical disk 1 and perpendicular to the seeking direction S.

Figure 4A:
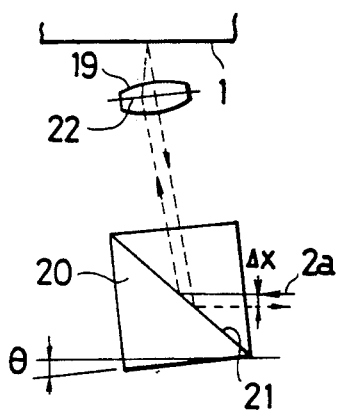
FIGS. 4(a) to 4(c) are side views of an optical pickup device, respectively, for explaining occurrence of offset of a reflected light beam with respect to an incident optical axis, due to inclination of a carriage.
Figure 4B:
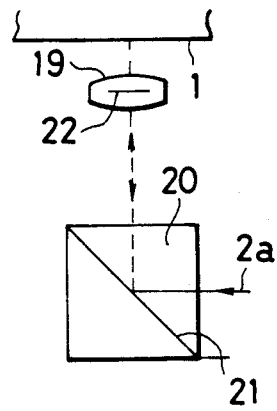
Figure 4C:
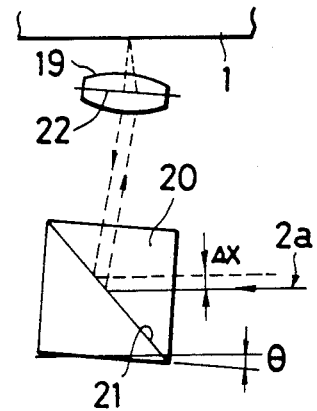

FIGS. 4(a) to 4(c) are schematical side views of the optical elements of the movable optical system of the conventional optical pickup device, respectively. In FIGS. 4(a) to 4(c), the same optical elements as those in the preferred embodiment of the present invention shown in FIG. 1, are represented by the same reference numerals for clarity.

FIG. 4(b) shows a desirable condition where the carriage 18 is positioned without any inclination with respect to the guide rail 17. As shown in FIGS. 4(a) and 4(c), when the carriage 18 is moved across the optical disk 1 between the inner circumference side (the left side) of the optical disk 1 or the outer circumference side (the right side) thereof, a deflecting face 21 of the deflecting prism 20 and a center plane 22 of the objective lens 19 are apt to be angularly displaced in accordance with an angle $\theta$ of inclination of the carriage 18.

Figure 5:
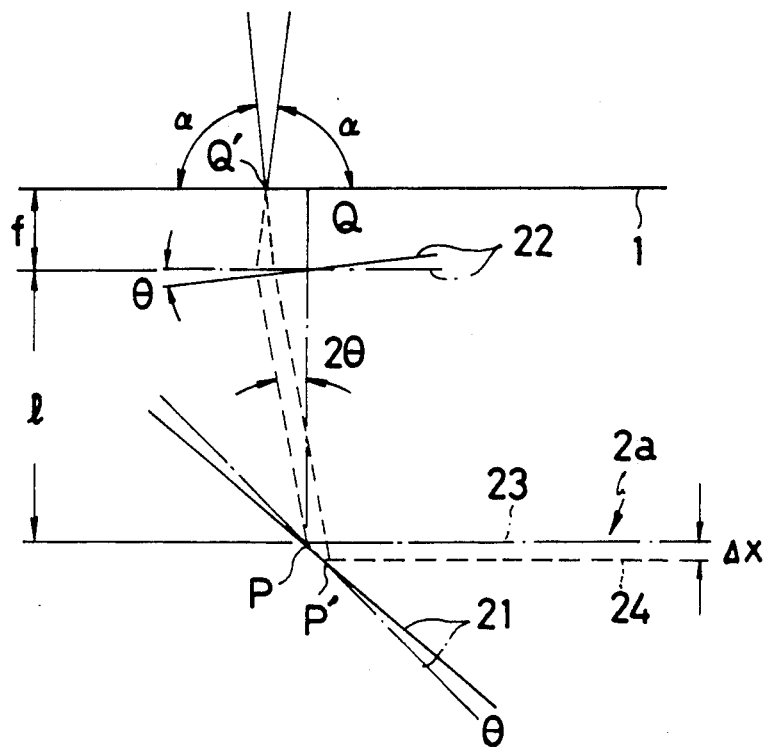
FIG. 5 is a diagrammatic side view showing details of optical paths shown in FIG. 4(a)

FIG. 5 shows in detail a relationship between the incident and reflected laser beams in the movable optical system 3, in which reference numeral 21 designates a deflection face 21 of the deflecting prism 20 (FIGS. 4(a), 4(b), 4(c)), reference numeral 22 designates a central plane of the objective lens 19 (FIGS. 4(a), 4(b), 4(c)), and reference numerals 23 and 24 designate incident and reflected light beams, respectively. Referring to FIG. 5, when the carriage has no inclination with respect to the guide rail, the deflection face 22 and the center plane 22 are each located at proper positions, as illustrated by the dashed lines, respectively, where the deflection face 21 is inclined at an angle of 45° with respect to the incident laser beam 23 from the stationary optical system 2, and the center plane 22 of the objective lens is parallel to the incident laser beam 23. In this condition, the incident laser beam 23 from the stationary optical system 2 is reflected at right angles by the deflection face 21 of the deflecting prism at a deflecting point P as a intersection of the incident optical axis 2a with the deflecting face 21. The laser beam deflected by the deflecting prism 22 is then converged on the recording surface of the optical disk 1 at a point Q, with the incident angle of 90° with respect to the optical disk 1.

On the other hand, when the carriage is inclined at an angle θ in the counterclockwise direction in FIG. 5, with respect to the guide rail, the inclination of deflection face 21 of the deflecting prism with respect to the incident optical axis 23 is changed to 45° −θ, as illustrated by the solid line in FIG. 5. The center plane 22 of the objective lens is also inclined at an angle θ with respect to a plane parallel to the incident optical axis 2a, as illustrated by the solid line in FIG. 5.

It is important that in the conventional optical pickup device, the distance l between the deflecting point P of the incident optical axis 2a and the center of the objective lens 19 is clearly greater than the twice of the focal length f of the objective lens 19, as shown in FIG. 5. In this construction, since the laser beam reflected by the deflection face 21 of the deflecting prism 20 is incident on the objective lens 19 with a deviation of angle 2θ, causing the laser beam to be converged by the objective lens 19 on the recording surface of the optical disk 1 at a point Q' which is apart from the point Q toward the left side thereof in FIG. 5. At this time, the incident angle α of the laser beam with respect to the optical disk 1 is less than 90 degrees. Accordingly, based on the law of reflection, the laser beam is reflected by the optical disk 1 with the same reflected angle α. The reflected laser beam from the optical disk 1 passes through the center plane 22 of the objective lens 19 and then reflected by the deflection face 21 of the deflecting prism 20 at a point P' which is apart from the point P toward the right side thereof.

Accordingly, as apparent from FIG. 5, an offset Δx occurs between the reflected optical axis of laser beam 24 and the incident optical axis 2a. Further, as shown in FIGS. 4(a) and 4(c), the direction of the offset Δx with respect to the incident optical axis is changed in accordance with the direction of inclination of the carriage 18.

Generally, the detection of the tracking condition has to be effected with a tolerance within an about 0.03 μm, while the detection of the focusing condition has to be effected with a tolerance within an about 0.3 μm. Accordingly, the occurrence of an offset between the reflected and incident optical axes has a great influence on the detection of tracking condition of the optical pickup device. More particularly, when the carriage 18 is inclined with the angle θ about the axis X with respect to the guide rail 17, the amount of the offset Δx from the incident optical axis 2a to the reflected optical axis of laser beam 24 is geometrically calculated by the following approximate equation $$\Delta x \approx 2(l-2f)\theta \quad (1)$$

Figure 6:
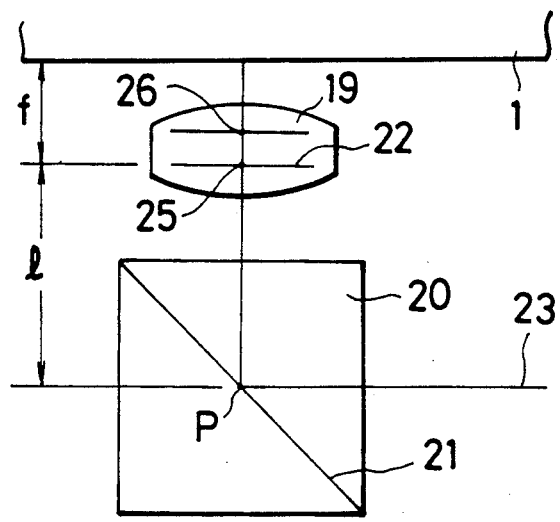
FIG. 6 is an enlarged side view of a main part of the optical pickup device shown in FIG. 1.

With respect to this, in the optical pickup device according to the invention, as shown in FIG. 6, the distance l between the deflecting point P of the incident optical axis 2a and the center 25 of the objective lens 19 and the focal length f of the objective lens 19 are decided so as to satisfy the following condition.

$$l = 2f$$

Therefore, it will be apparent that $\Delta x \approx 0$ is obtained by substituting l=2f in equation (1). In this way, even if the carriage 18 is inclined with the angle θ about the axis X with respect to the guide rail 17, the reflected optical axis of laser beam 24 is maintained in conformity with the incident optical axis 2a. Therefore, exact detection of the tracking condition of the optical pickup device as well as the detection of the focusing condition thereof with respect to the optical disk 1 can be carried out with a high accuracy.

Generally, it is well known that the objective lens 19 of the thick lens type has two principal points: a primary principal point 25, which is located close to the deflecting prism 20, and a secondary principal point 26 which is located close to the optical disk 1, as shown in FIG. 6. The primary and secondary principal points 25 and 26 are the points of intersection between the primary and secondary principal planes and the center axis of the lens 19, respectively. It should be noted that in the foregoing description and the attached claims, the center point of the objective lens 19 means the primary principal point 25, and the center plane 22 including the center point of the objective lens 19 means the primary principal plane. The distance l between the deflection prism 21 and the objective lens 19 means, strictly speaking, the distance between the deflection prism 21 and the primary principal point 25, and the center axis of the objective lens 19 means the line passing through the primary principal point 25 in the embodiment. As the objective lens is thin in the width and the distance between the point 25 and the point 26 is very small, the point 25 is deemed to be the center point of the objective lens 19.

As mentioned above, the accuracy of detection of the tracking condition of the optical pickup device, which is generally required in ordinary optical pickup devices, is on the order of 0.03 μm. Accordingly, in the present invention, the condition $l \approx 2f$ is allowed as far as the accuracy of detection of the tracking condition of the movable optical system meets the requirements.

While the invention has been described in conjunction with specific embodiments thereof, it is evident that many alternatives and modifications will be apparent to those skilled in the art in light of the foregoing description. Accordingly, it is intended to include all such alternatives and modifications as fall within the spirit and scope of the appended claims.

What is claimed is:

1. An optical pickup device for an optical disk having a recording surface, comprising:
   means for transmitting and receiving a light beam along a first optical axis;
   a guide disposed along said first optical axis;
   a carriage mounted on said guide to move along said first optical axis;
   a deflecting member disposed on said carriage and having a deflecting surface, wherein the light beam transmitted along said first axis from said means for transmitting and receiving is received at a deflection point of said deflecting surface and is deflected by the deflecting member along a second optical axis and a light beam incident on the deflection point along said second optical axis is deflected by the deflecting member to said means for transmitting and receiving along said first optical axis; and an object lens disposed on said carriage and positioned on said second optical axis between the optical disk and said deflecting member for converging the light beam which is received along said first optical axis by the deflection point of said deflecting surface and is deflected thereby toward the recording surface of said optical disk along said second axis and for directing a light beam reflecting from the recording surface toward the deflection point of said deflecting surface along said second optical axis;

wherein a distance between the deflection point of said deflecting surface and a center of said object lens is approximately twice a focal length of said object lens to compensate for carriage/guide play or wobble.

2. An optical pickup device according to claim 1, in which said object lens is a lens having a principal focus at the center of said object lens, which is located close to said deflecting member.

3. An optical pickup device according to claim 1, in which said object lens is adjustable in position with respect to said carriage along said second optical axis.

4. An optical pickup device according to claim 1, in which said carriage is mounted on a guide rail disposed on said guide.

5. An optical pickup device according to claim 1, in which said deflecting member is a deflecting prism.

6. An apparatus according to claim 1, in which said means for transmitting and receiving comprises a focusing detector for detecting a focusing condition of the light beam with respect to the recording surface of said optical disk, a tracking detector for detecting a tracking condition of the light beam with respect to the recording surface of said optical disk and a light beam dividing means for dividing the light beam deflected from the deflection point of said deflecting surface toward said means for transmitting and receiving into two light beams such that one of the two divided light beams is received by said focusing detector and the other of the two divided light beams is received by said tracking detector.

7. An optical pickup device according to claim 1, in which said means for transmitting and receiving includes a semiconductor laser.

* * * * *